(12) United States Patent
Olding et al.

(10) Patent No.: US 6,987,536 B2
(45) Date of Patent: Jan. 17, 2006

(54) METHOD AND APPARATUS FOR STORING IMAGE INFORMATION FOR MULTIPLE SAMPLING OPERATIONS IN A DIGITAL PIXEL SENSOR

(75) Inventors: Benjamin P. Olding, Mountain View, CA (US); Justin Reyneri, Los Altos, CA (US)

(73) Assignee: Pixim, Inc., Mountain View, CA (US)

( * ) Notice: Subject to any disclaimer, the term of this patent is extended or adjusted under 35 U.S.C. 154(b) by 888 days.

(21) Appl. No.: 09/823,838

(22) Filed: Mar. 30, 2001

(65) Prior Publication Data

US 2002/0140842 A1    Oct. 3, 2002

(51) Int. Cl.
*H04N 3/14* (2006.01)
(52) U.S. Cl. ............... 348/297; 348/294; 348/362; 341/155
(58) Field of Classification Search ........ 348/297, 348/302, 362, 294, 272, 273, 241; 250/208.1; 375/240.16
See application file for complete search history.

(56) References Cited

U.S. PATENT DOCUMENTS

| | | | |
|---|---|---|---|
| 5,461,425 A | 10/1995 | Fowler et al. | 348/294 |
| 5,801,657 A | 9/1998 | Fowler et al. | 341/155 |
| 6,369,737 B1 * | 4/2002 | Yang et al. | 341/155 |
| 6,560,285 B1 * | 5/2003 | Reitmeier et al. | 375/240.16 |
| 2001/0040632 A1 * | 11/2001 | Yang et al. | 348/294 |

FOREIGN PATENT DOCUMENTS

JP          04-313949       * 11/1992

OTHER PUBLICATIONS

Yang et al., "A 640×512 CMOS Image Sensor with Ultra-wide Dynamic Range Floating-Point Pixel-Level ADC", Dec. 1999, IEEE Journal of Solid-State Circuits, vol. 34, No. 12.*

* cited by examiner

*Primary Examiner*—David L. Ometz
*Assistant Examiner*—Brian Jelinek
(74) *Attorney, Agent, or Firm*—Carmen C. Cook; Patent Law Group LLP

(57) ABSTRACT

A method for storing image information in a digital pixel sensor is disclosed for reducing the size of the memory needed to facilitate multiple sampling. An image sensor includes a sensor array of pixel elements generating pixel data in k bits and a data memory for storing pixel data of each pixel element. In one embodiment, the data memory in the digital pixel sensor stores an m-bit time index value and the lower k−1 bits of the pixel data for pixel data exceeding the predetermined threshold level in all exposure times except the last. When pixel data in the last exposure time is captured, the data memory stores the time index value in less than m bits and stores the k-bit pixel data. The size of the data memory is minimized while preserving the image quality. The method of the present invention provides the benefits of reducing manufacturing cost and improving production yield.

18 Claims, 7 Drawing Sheets

METHOD AND APPARATUS FOR STORING IMAGE INFORMATION FOR MULTIPLE SAMPLING OPERATIONS IN A DIGITAL PIXEL SENSOR

CROSS-REFERENCE TO RELATED APPLICATION

The present application is related to concurrently filed and commonly assigned U.S. patent application bearing Ser. No. 09/823,843, entitled "Method And Apparatus for Companding Pixel Data in a Digital Pixel Sensor," by Justin Reyneri and Benjamin P. Olding.

FIELD OF THE INVENTION

The invention relates image sensor systems, and in particular, the present invention relates to a method for storing image information when multiple sampling is used in a digital image sensor.

BACKGROUND OF THE INVENTION

A CMOS image sensor with pixel level analog-to-digital conversion is described in U.S. Pat. No. 5,461,425 of B. Fowler et al. (the '425 patent). Such an image sensor, referred to as a digital pixel sensor (DPS), provides a digital output signal at each pixel element representing the light intensity detected by that pixel element. The combination of a photodetector and an analog-to-digital (A/D) converter in an area image sensor helps enhance detection accuracy and reduce power consumption, and improves overall system performance.

In the DPS array of the '425 patent, the analog-to-digital conversion (ADC) is based on first order sigma delta modulation. While this ADC approach requires fairly simple and robust circuits, it has the disadvantages of producing too much data and suffering from poor low light performance. U.S. Pat. No. 5,801,657 of Fowler et al., and U.S. patent application Ser. No. 09/274,202 provide alternative ADC mechanisms that can significantly improve the overall system performance while minimizing the size of the A/D converters. The aforementioned patents and patent application are incorporated herein by reference in their entireties.

An integrated DPS sensor may include an on-chip memory for storing at least one frame of pixel data. The incorporation of an on-chip memory in a DPS sensor alleviates the data transmission bottleneck problem associated with the use of an off-chip memory for storage of the pixel data. In particular, the integration of a memory with a DPS sensor makes feasible the use of multiple sampling for improving the quality of the captured images. Multiple sampling is a technique capable of achieving a wide dynamic range without many of the disadvantages associated with other dynamic range enhancement techniques, such as degradation in signal-to-noise ratio and increased implementation complexity. The aforementioned patent and patent applications are incorporated herein by reference in their entireties.

FIG. 1 shows a functional block diagram of an image sensor 300. The operation of image sensor 300 using multiple sampling is described as follows. Image sensor 300 includes a DPS sensor array 302 which has an N by M array of pixel elements. Sensor array 302 is similar to the digital pixel sensor described in the '425 patent and incorporates pixel level analog-to-digital conversion. A sense amplifier and latch circuit 304 is coupled to sensor array 302 to facilitate the readout of digital signals from sensor array 302. The digital signals (also referred to as digital pixel data) are stored in digital pixel data memory 310. To support multiple sampling, image sensor 300 also includes a threshold memory 306 and a time index memory 308 coupled to sensor array 302. Threshold memory 306 stores information of each pixel indicating whether the light intensity value measured by each pixel in sensor array 302 has passed a predetermined threshold level. In this example, the information is stored as a one-bit threshold indicator bit. The exposure time indicating when the light intensity measured by each pixel has passed the threshold level is stored in time index memory 308. In this example, the time index value is a two-bit value identifying each time exposure. As a result of this memory configuration, each pixel element in sensor array 302 can be individually time-stamped by threshold memory 306 and time index memory 308 and stored in digital pixel data memory 310.

With the memory configuration outlined above and illustrated in FIG. 1, image sensor 300 can implement multiple sampling to improve the quality of an image. In multiple sampling, each pixel element is exposed to an image at two or more different exposure times in order to compensate for bright and dark portions of the image. Additionally, the information regarding the exposure time associated with each pixel and the integrated intensity for that pixel is stored in time index memory 308 and digital memory 310 for use in computing the simulated pixel intensity when needed.

Sensor array 302 is an N by M array of pixels where each pixel outputs a digitized pixel voltage signal having k bits. Thus, the size of threshold memory 306 is N by M bits and the size of time index memory 308 is N by M by m bits where m is the number of bits representing the time index values. For example, when the resolution of sensor array 302 is 1024 by 1024 pixels, each pixel outputting 10 bits each (i.e., N=M=1024 and k=10), the size of threshold memory 306 is 1 megabits, the size of time index memory 308 with a 2-bit time index value is 2 megabits, and digital pixel data memory 310 is at least 10 megabits (or 1024×1024×10 bits) for storing one frame of image data.

To implement multiple sampling in an image sensor, memory space must be provided to store image information such as the threshold indicator bit and the time index value. When image sensor 300 in the example above is implemented in an integrated circuit, the size of the on-chip memory must be at least 13 megabits. If the resolution of the sensor array (i.e. the number of pixel elements) increases, the size of the on-chip memory will increase correspondingly. Integrating a large on-chip memory in an image sensor not only increases manufacturing cost but also adversely impacts yield. Therefore, it is desirable to minimize the size of the on-chip memory while supporting multiple sampling operations in a digital image sensor.

SUMMARY OF THE INVENTION

According to an embodiment of the present invention, an image sensor includes a sensor array made up of a two-dimensional array of pixel elements. The sensor array outputs digital signals as k-bit pixel data representing an image of a scene. The sensor array generates multiple representations of the image at multiple exposure times. The sensor array further includes a data memory, in communication with the sensor array, for storing a time index value and the k-bit pixel data for each of the pixel elements. The time index value indicates the exposure time when the pixel data of a pixel element exceeds a predetermined threshold level and the pixel data is stored at that exposure time. The time index value also has encoded within a threshold indication for each of the pixel elements. In operation, the data memory store the time index value in t bits and stores the k-bit pixel data for pixel data being captured in a last one of the multiple exposure times. The data memory stores the time index value in m-bit and stores the lower k+t−m bits of the pixel data for pixel data exceeding the predetermined threshold level in other exposure times.

The image information storage method of the present invention permits the size of the on-chip memory in a digital image sensor to be reduced while preserving the image resolution. By reducing the size of the on-chip memory, the method of the present invention provides the benefits of reducing manufacturing cost and improving production yield.

The present invention is better understood upon consideration of the detailed description below and the accompanying drawings.

DETAILED DESCRIPTION OF THE PREFERRED EMBODIMENTS

In accordance with the present invention, a method and apparatus for storing image information in a digital pixel sensor is provided for reducing the size of the memory needed to facilitate multiple sampling. The image information storage method of the present invention permits the size of the on-chip memory in a digital image sensor to be reduced while preserving the image resolution. By reducing the size of the on-chip memory, the present invention provides the benefits of reducing manufacturing cost and improving production yield.

In the present description, a digital pixel sensor (DPS) array or a sensor array refers to a digital image sensor having an array of photodetectors where each photodetector produces a digital output signal. In one embodiment of the present invention, the DPS array implements the digital pixel sensor architecture illustrated in FIG. 2 and described in the aforementioned '425 patent. The DPS array of the '425 patent utilizes pixel level analog-to-digital conversion to provide a digital output signal at each pixel. The pixels of a DPS array are sometimes referred to as a "sensor pixel" or a "sensor element" or a "digital pixel," which terms are used to indicate that each of the photodetectors of a DPS array includes an analog-to-digital conversion (ADC) circuit, and is distinguishable from a conventional photodetector which includes a photodetector and produces an analog signal. The digital output signals of a DPS array have advantages over the conventional analog signals in that the digital signals can be read out at a much higher speed. Of course, other schemes for implementing a pixel level A/D conversion in an area image sensor may also be used in the image sensor of the present invention.

Figure 2:
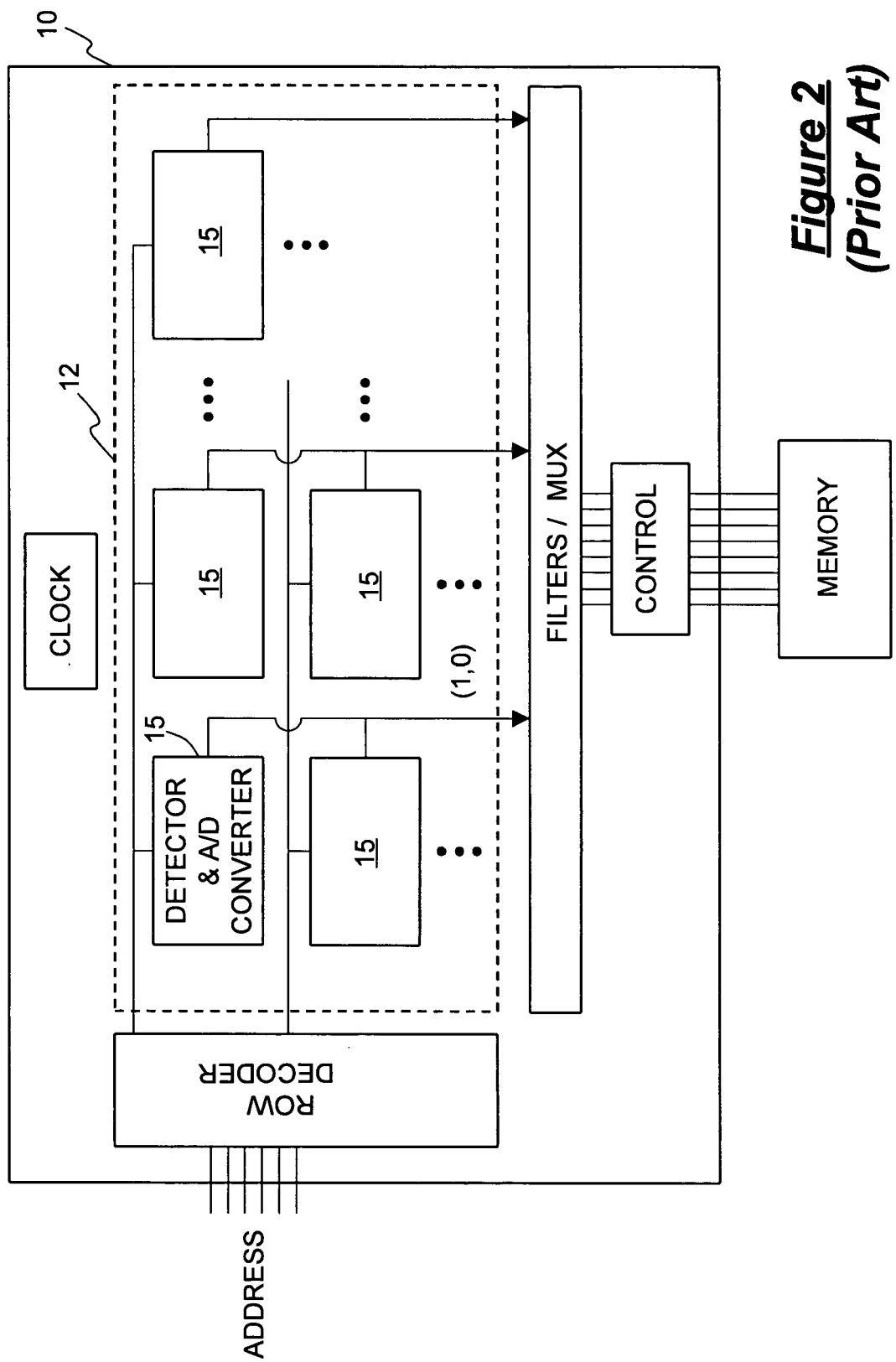
FIG. 2 is a block diagram of a digital image sensor as described in U.S. Pat. No. 5,461,425 of Fowler et al.

In the digital pixel sensor architecture shown in FIG. 2, a dedicated ADC scheme is used. That is, each of pixel element 15 in sensor array 12 includes a ADC circuit. The image sensor of the present invention can employ other DPS architectures, including a shared ADC scheme. In the shared ADC scheme, instead of providing a dedicated ADC circuit to each photodetector in a sensor array, an ADC circuit is shared among a group of neighboring photodetectors. For example, in one embodiment, four neighboring photodetectors may share one ADC circuit situated in the center of the four photodetectors. The ADC circuit performs A/D conversion of the output voltage signal from each photodetectors by multiplexing between the four photodetectors. The shared ADC architecture retains all the benefits of a pixel level analog-to-digital conversion while providing the advantages of using a much smaller circuit area, thus reducing manufacturing cost and improving yield.

In one embodiment of the present invention, the ADC circuit of each digital pixel or each group of digital pixel is implemented using the Multi-Channel Bit Serial (MCBS) analog-to-digital conversion technique described in the aforementioned '657. The MCBS ADC technique of the '657 patent can significantly improve the overall system performance while minimizing the size of the ADC circuit. Furthermore, as described in the '657 patent, an MCBS ADC has many advantages applicable to image acquisition and more importantly, facilitates high-speed readout.

As described above, FIG. 1 illustrates the memory configuration for facilitating multiple sampling in image sensor 300. Image sensor 300 includes threshold memory 306, time index memory 308 and digital pixel data memory 310. In image sensor 300, separate memory blocks or separate locations in a memory array are provided to store the threshold indicator information, the time index values and the digital pixel data. In the example given above where DPS array 302 outputs pixel data in 10 bits, threshold data and time index values are stored in 1 bit and 2 bits, respectively, 13 bits are used to store all of the image information for each pixel element in DPS sensor array 302. Therefore, in the configuration of image sensor 302, a memory size of N by M by 13 is required to store one frame of image data and to support multiple sampling operations. For example, when DPS array 302 has 1024 by 1024 pixel elements, the on-chip memory is at least 13 megabits. The image storage method of the present invention employs innovative image information storage schemes to reduce the amount of memory needed to store all of the image information for facilitating multiple sampling operations in a DPS sensor array. In the following description, the digital pixel data, the threshold indicator information and the time index values generated in an image sensor during the multiple sampling operations are collectively referred to as "image information."

Figure 1:
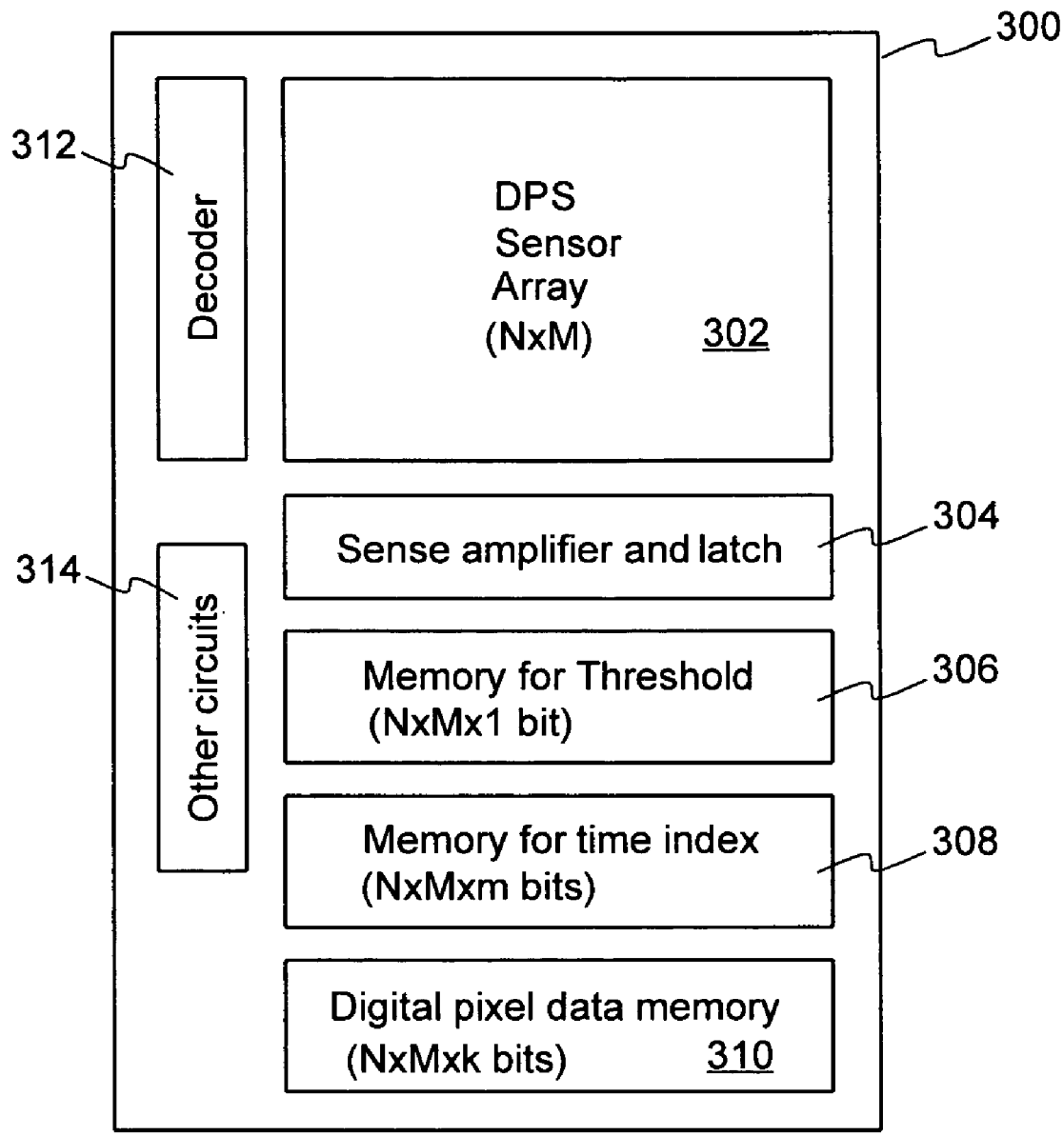
FIG. 1 is a functional block diagram of an image sensor.
Figures 3, 4:
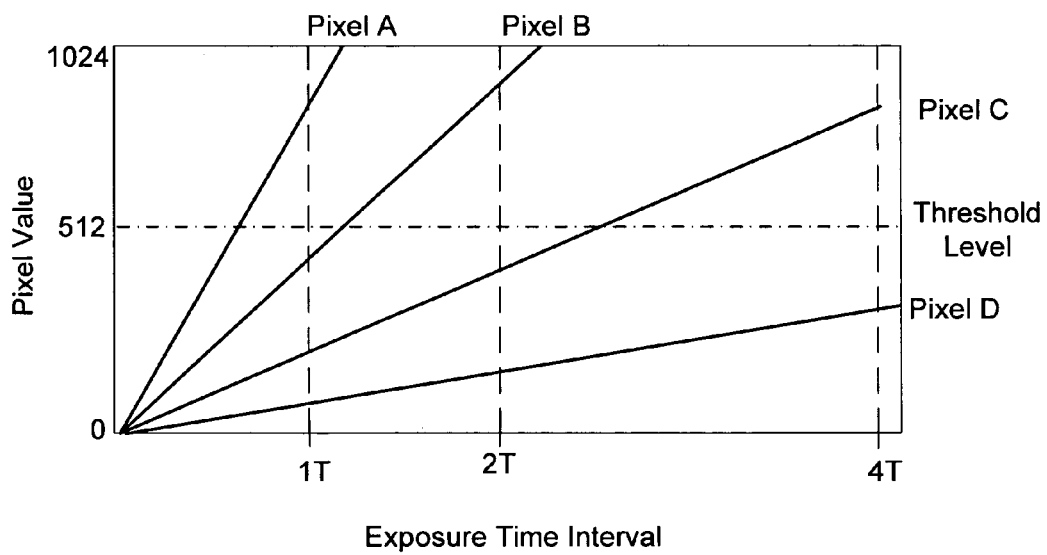
FIG. 3 illustrates four rows of exemplary memory cells which are used to store the 13-bit image information in the memory configuration of FIG. 1.
FIG. 4 illustrates the pixel intensity values vs. exposure time for four representative pixels A, B, C, and D detected by a DPS array.

FIG. 3 illustrates four rows of exemplary memory cells which are used to store the 13-bit image information in the memory configuration of FIG. 1. FIG. 3 is included to illustrate the multiple sampling operation of image sensor 300 of FIG. 1 and to provide a contrast to the innovative image information storage method of the present invention. Referring to FIG. 3, each row of memory cells contains 13 bits for storing image information including the threshold indicator bit (memory cell 355), the time index value (2-bit memory cells 357) and the digital pixel data (10-bit memory cells 359). To facilitate the description of the present invention, a row of memory cells containing 13 bits is explicitly allocated for each pixel. However, it is known to those skilled in the art that other memory allocation schemes are possible, such as storing different number of bits in each row of memory cells. The multiple sampling operation of image sensor 300 is described in conjunction with FIG. 4 which illustrates the pixel intensity values vs. exposure time for four representative pixels A, B, C, and D detected by a DPS array such as array 302.

When multiple sampling is used, pixel values are first read out at an exposure time 1T and a multiple sampling logic circuit in image sensor 300 performs a threshold comparison operation on the pixel values. The threshold comparison operation can be implemented in a variety of ways. In the present example, a 50% threshold level is used. Thus, at time 1T, the multiple sampling logic circuit of image sensor 300 compares the pixel values readout from each pixel element of DPS array 302 and determines which of the pixel intensity values exceeds the 50% threshold level. For example, in FIG. 4, pixel A has an intensity value exceeding the 50% threshold level while pixels B to D have intensity values below the threshold level. Pixel data for pixels A to D are recorded in data memory 310. Row 324 of FIG. 3 illustrates the image information recorded for pixel A. The threshold indicator bit (cell 355) of row 324 is set to a value of "0" in this case to indicate that pixel A has reached the threshold level. The threshold indicator bit will be used to prevent further updating of pixel data for pixel A in digital pixel data memory 310. The time index value "00" associated with the exposure time 1T is stored in cells 357 of row 324. The pixel data value and the time index value for pixel A will be used by image sensor 300 to derive the resultant intensity value of pixel A. The pixel data for pixels B to D are also stored (not shown) and the threshold indicator bit (memory cell 355) for each of these pixels are set to a value of "1" to indicate that the pixel data has not reached the threshold level yet and therefore, can be updated in subsequent exposure times.

In FIG. 4, the multiple sampling process continues with sensor readout being taken after exposure times of 2T and 4T where the time 4T is the last exposure time. Each time the pixel intensity value of a pixel exceeds the 50% threshold level, the threshold indicator bit is set to "0" and the associated time index for that pixel is stored in the time index memory 308. The measured digital pixel values are stored in pixel data memory 310. For instance, row 326 stores the image information for pixel B which pixel intensity value exceeds the threshold level at an exposure time of 2T. A time index value of "01" is stored in cells 357 of row 326 to indicate the exposure time of 2T. Row 328 stores the image information for pixel C which pixel intensity value exceeds the threshold level at the last exposure time of 4T. A time index value of "10" is stored in row 328 to indicate the exposure time of 4T. Finally, the pixel intensity value of pixel D has not reached the threshold level by the last exposure time 4T and so the threshold indicator bit for pixel D is not altered. The time index value of "10" is stored and the pixel data is recorded in row 330. In this manner, 13 bits of image information is used to facilitate the multiple sampling operations in image sensor 300.

Figure 5:
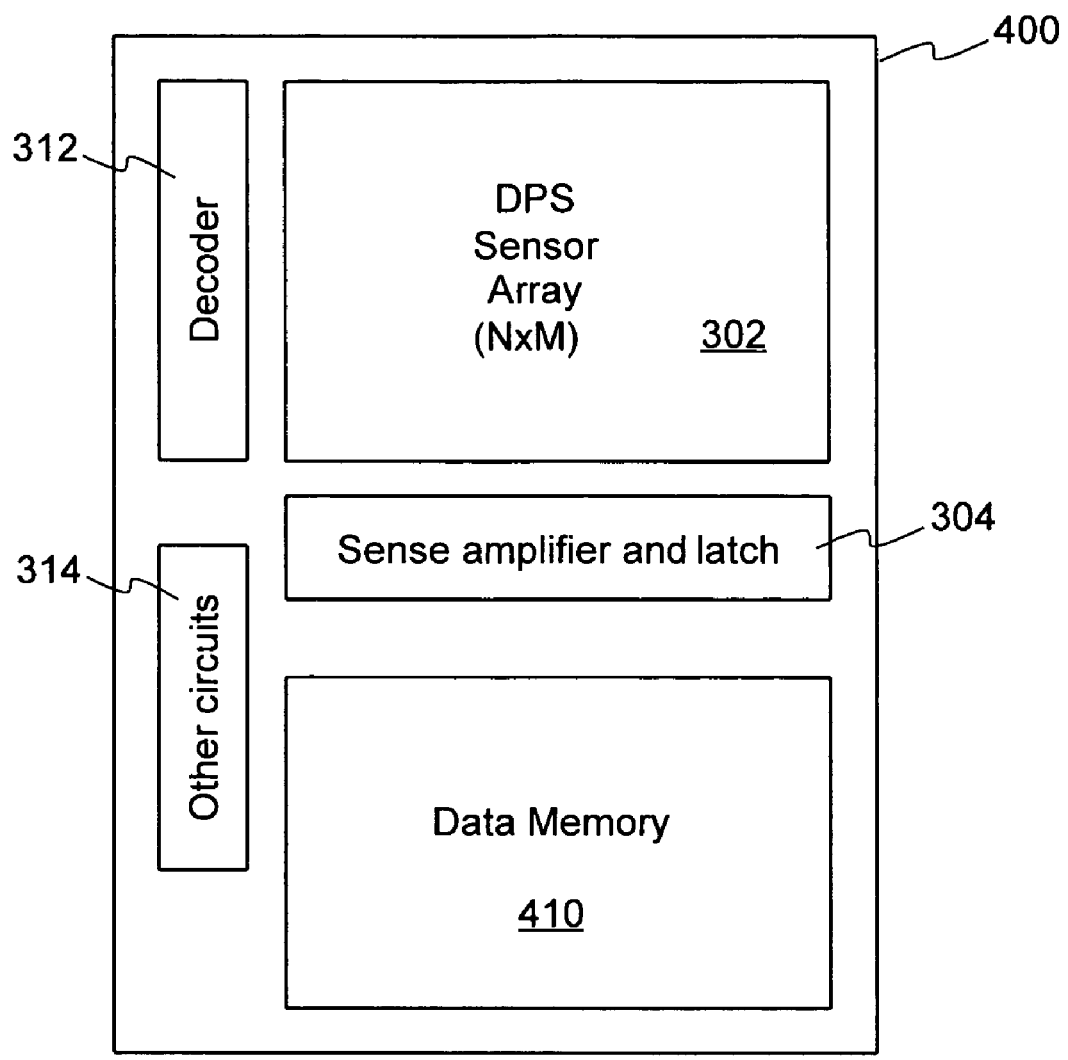
FIG. 5 is a functional block diagram of an image sensor according to one embodiment of the present invention.

Turning now to the image information storage method for facilitating multiple sampling of the present invention, FIG. 5 is a functional block diagram of an image sensor 400 according to one embodiment of the present invention. In the present description, like objects which appear in more than one figure are provided with like reference numerals to simplify the discussion. Image sensor 400 includes a DPS sensor array 302 which operates in the same manner as previously described and provides digital pixel data as output signals. Image sensor 400 further includes a data memory 410 which integrates the storage of the threshold indicator information, the time index values, and the pixel data. The image information storage method of the present invention minimizes the amount of memory needed in memory 410 to facilitate multiple sampling. Of course, image sensor 400 may include other circuitry such as decoder 312 and sense amplifier and latch circuit 304 which operate in the same manner as image sensor 300.

Figure 6:
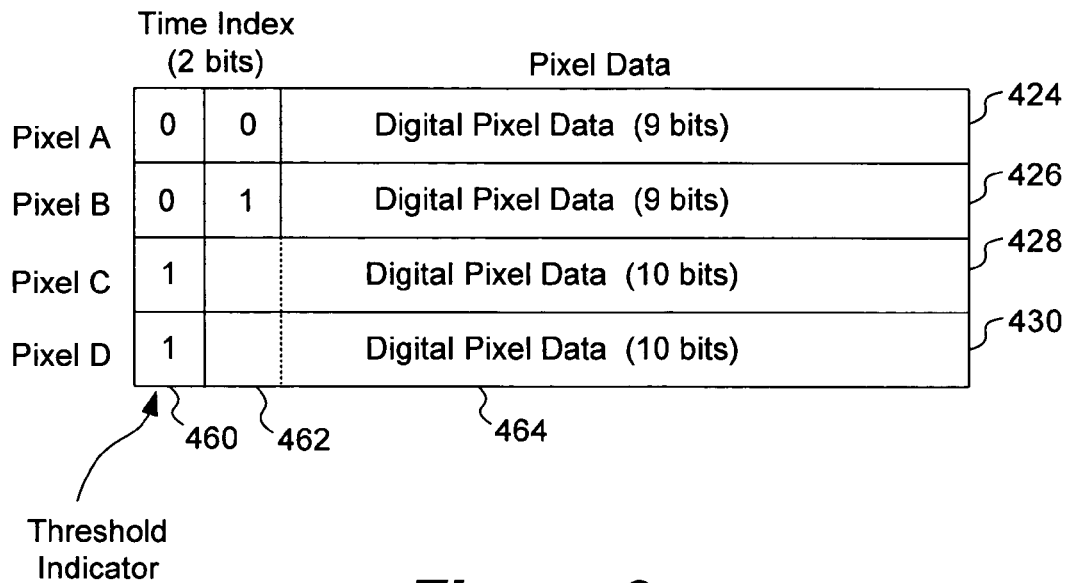
FIG. 6 illustrates four rows of exemplary memory cells in a data memory used to store the image information according to one embodiment of the present invention.

FIG. 6 illustrates four rows of exemplary memory cells in data memory 410 used to store the image information according to one embodiment of the present invention. In the present embodiment, only 11 bits are needed to capture all of the image information for each pixel element of DPS array 302 in image sensor 400, as opposed to 13 bits required for image sensor 300. The present embodiment is thus referred to as the "11-bit image information embodiment." Thus, data memory 410 can have a smaller memory size than the size of the total memory in image sensor 300. Specifically, a total of N×M×2 bits of memory cells is saved by using the image information storage method according to the present embodiment of the present invention. Thus, image sensor 400 can be made with a smaller device size and can realize reduced cost and increased production yield.

In accordance with the present invention, image sensor 400 encodes the threshold indicator information in the time index values and alternates between storing the entire time index value or a portion of the time index value only to make room for storing an additional bit of pixel data in data memory 410. In this manner, image sensor 400 makes efficient use of the memory space in data memory 410. In operation, in the last exposure time, image sensor 400 stores the time index value using only a portion of the assigned memory location and image sensor 400 uses the remaining memory location to store additional pixel data information. Encoding the threshold indicator information in the time index values eliminates the need to use a separate threshold indicator bit. Therefore, in accordance with the present embodiment, only 11 bits total are needed to store all the image information needed.

Referring to the 11-bit image information embodiment in FIG. 6, data memory 410 includes memory cells 460 and 462 in each of rows 424 to 430 designated to store a 2-bit time index value. Memory cells 464 are designated to store 9 bits of pixel data. The 2-bit time index value stored in cells 460 and 462 also includes encoded threshold indicator information. In the present embodiment, the threshold indicator information is encoded in the first bit of the two-bit time index value, that is, cell 460. Of course, in other embodiments where the time index value is stored in more than 2 bits, the threshold indicator information may be encoded in one or more bits of the time index value. According to the present embodiment, in the "all-other exposure cases," data memory 410 stores the time index values in two bits and the pixel data in 9 bits. The term "all-other exposure cases" is used to refer to situations where the pixel intensity value of a pixel element exceeds the predetermined threshold level at any one of the exposure times before the last exposure time. In those cases, it is necessary to retain the time index values as well as the pixel data so that the pixel data for the pixel element can be normalized later on to provide a resultant pixel data value.

On the other hand, in the "last exposure case" where the pixel intensity value of the pixel element has not exceeded the threshold level before the last exposure time, the pixel data is captured at the last exposure time and is stored as a 10-bit pixel data in data memory 410. According to the present embodiment, in the last exposure case, only one bit of the time index value (cell 460) is stored and the remaining bit (cell 462) in the time index value is provided to store an additional bit of pixel data. Thus, in the last exposure case, both the time index value and the threshold indicator information are encoded in memory cell 460 and memory cell 462, the second bit of the time index value, is combined with the 9-bit memory cells 464 to provide memory cells for storing the 10-bit pixel data. In this manner, the 11-bit image information embodiment provides the same number of data bits for storing pixel data as in the prior method shown in FIG. 3. Thus, the 10-bit pixel data can be perfectly represented. In FIG. 6, the 11-bit image information is shown as being arranged in a contiguous fashion. Of course, this is illustrative only and one of ordinary skill in the art would understand that memory cells 460, 462 and 464 need not be allocated in a contiguous manner and in actual implements, can be arranged in any fashion which facilitates memory access for reading and writing. In fact, it is known to those skilled in the art that various other memory allocation schemes can be used for storing memory cells 460, 462 and 464 in data memory 410. For example, data memory 410 can store different number of data bits in each row of memory cells in the memory array. In this manner, data memory 410 provides flexibility in storing pixel image information and provides efficient use of the memory cells in data memory 410.

The operation of the image information storage method of the present invention will now be described in conjunction with FIG. 4. When multiple sampling is used in image sensor 400, pixel values are read out at exposure times of 1T, 2T and 4T, where exposure time 4T is the last exposure time. Exposure times 1T and 2T are represented by time index values "00" and "01" respectively. The exposure time 4T is represented by the time index value "1" in the first bit of the 2-bit time index value. The threshold level is set at 50% in the present example. For pixel data represented in 10 bits, the 50% threshold level represents a pixel intensity value of 512. Row 424 stores the image information for pixel A which intensity level exceeded the threshold level at the exposure time 1T. Assume that pixel A has an intensity value of 780 at exposure time T1, image sensor 400 determines that pixel A has exceeded the 50% threshold level and proceeds to store the image information for pixel A. The time index value "00" representing exposure time T1 is stored in cells 460 and 462 of row 424. The value of "0" in cell 460 (the threshold indicator) functions to indicate that pixel A has exceeded the threshold level and prevents further updating of the pixel data. The lower 9 bits of the 10 bit pixel data for pixel A is stored in memory cells 464 of row 424. That is, a value of 268 in 9-bit representation is stored for pixel A. Thus, according to the present embodiment, only 11 bits are needed to store all of the image information for a pixel element in image sensor 400 without compromising the image quality.

In accordance with the present embodiment, even though only the lower 9 bits of the 10-bit pixel data are stored, the pixel value is preserved. This is because the 10$^{th}$ bit, or the most significant bit (MSB), of the pixel intensity value is necessarily a "1" when the pixel intensity value exceeds the 50% threshold level. Thus, the MSB of the pixel data need not be stored but instead can be reintroduced later based on the time index values. In the present example, a pixel value of 780 is represented in binary as "1100001100" while the lower 9 bits provides a value of 268 and the 10$^{th}$ bit provides a value of 512 which is the threshold value. In the present embodiment, a value of 268 in 9 bits is stored in memory cells 464.

When the resultant pixel value for pixel A is to be computed later by image sensor 400 (or other image processing device coupled to image sensor 400), image sensor 400 retrieves the pixel data stored in row 424 of memory 410 and recognizes that pixel A has exceeded the threshold level at time T1 based on the time index value "00" stored in cells 460 and 462. Consequently, image sensor 400 will automatically add the threshold value 512 to the pixel value stored in memory cells 464 of row 424 before computing the resultant pixel value for pixel A. Thus, the pixel value of 780 recorded at exposure time T associated with pixel A is preserved entirely. The resultant pixel value for pixel A, that is, the pixel value for pixel A at the last exposure time, is computed as 4 times 780.

Turning now to pixel B, row 426 stores the image information for pixel B which exceeds the threshold level at exposure time 2T. Thus, a time index value of "01" is stored in memory cells 460 and 462. The lower 9 bits of the pixel data of pixel B are stored in memory cells 464 of row 426. The storage and retrieval of pixel data value for pixel B is analogous to pixel A. The measured pixel value less 512 is stored as a 9-bit number. Then, when the simulated pixel data for pixel B is to be computed, a value of 512 is added back to the 9-bit number stored in cells 464 of row 426 to arrive at the actual measured pixel value for pixel B.

Turning now to pixels C and D where in exposure times 1T and 2T, the pixel data have not exceeded the threshold level, the pixel data in 10 bits are written in rows 428 and 430 (not shown) and a value of "1" is written in the threshold indicator (cell 460). In this manner, the value of "1" indicates that the pixel data for these pixels have not exceeded the threshold level and that the pixel data for pixels C and D can be further updated in subsequent exposure times. In FIG. 4, pixels C and D have not exceeded the threshold level before the last exposure time 4T. Thus, the pixel data values of pixels C and D at exposure time 4T are stored as 10-bit pixel data. Memory cell 460 of each of rows 428 and 430 maintains the value of "1", indicating that the threshold level has not been previously exceeded. Of course, memory cell 460 can also be rewritten with the value of "1". The writing of memory cell 460 in each of the exposure time is optional. In other embodiments, memory cell 460 can be written at each exposure times regardless of the pixel data value or memory cell 460 can be written at the first exposure time only and updated only when the pixel data exceeds the threshold level and the time index value is stored. Memory cell 462 and 9-bit memory cells 464 are used to store the 10-bit pixel data. In the last exposure case, all 10 bits of the pixel data needs to be stored because the pixel data can have a value larger than or less than 512. For instance, pixel C has a pixel value exceeding the 50% threshold value and pixel D has a pixel value less than the 50% threshold value. In either case, the 10 bits pixel data for pixels C and D are stored in their respective rows 428 and 430. When the pixel data are retrieved later on, the value of "1" in the threshold indicator (cell 460) indicates that the pixel data in rows 428 and 430 have not exceeded the threshold level before the last exposure time and that the pixel data stored are 10 bits pixel data.

In the embodiment shown in FIG. 6, the image information storage method of the present invention achieves a 2-bit reduction in memory size for each pixel element. Thus, in DPS array 302 having N by M pixel elements, a reduction in overall memory size of N×M×2 bits is achieved. When DPS array 302 is a 1024 pixels by 1024 pixels array, a memory size reduction of 2 megabits can be realized. Image sensor 400 thus constructed has a smaller device size, resulting in lower manufacturing cost and improved yield.

In the present embodiment, the pixel data retrieval and computation process can be implemented either in hardware or in software. Thus, in one embodiment, logic circuits are included in image sensor 400 for computing the pixel data upon retrieval of the pixel data from data memory 410. In another embodiment, the time index values and the pixel data can be read out of image sensor 400 into an image processing device where the pixel data are computed using software. Normalization of the pixel data can be carried out after the pixel data value is computed. Thus, in a software implementation, the pixel data in data memory 410 is read into a variable. This variable is then applied to a lookup table which matches the value of the variable to a 12-bit integer representing the normalized pixel data value. This 12-bit integer can then be used in the remainder of the imaging pipeline.

According to another embodiment of the present invention, the image information storage method provides further reduction of the number of bits used to store image information. The further reduction is accomplished through companding of the pixel data. Although in the present description, companding of pixel data is described in conjunction with the use of multiple sampling in a digital image sensor, companding of pixel data can be used even when the image sensor is not using multiple sampling. As will be described in more detail below, companding can be used to compress the pixel data so that fewer number of data bits is required to represent the pixel data. Companding can be applied in an image sensor for reducing the memory storage space required whether or not multiple sample is applied.

Figure 7:
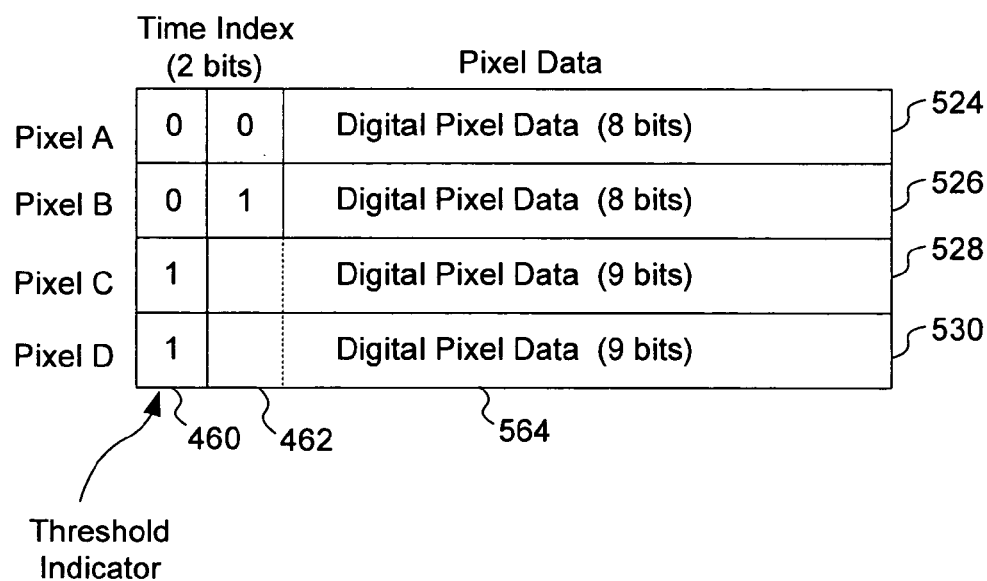
FIG. 7 illustrates four rows of exemplary memory cells for storing image information according to another embodiment of the present invention.

FIG. 7 illustrates four rows of exemplary memory cells for storing image information according to another embodiment of the present invention. In the embodiment shown in FIG. 7, a total number of 10 bits is used to store the image information, as opposed to the 11 bits of the previous embodiment. The present embodiment is referred to as the "10-bit image information embodiment." The 1-bit reduction from the embodiment shown in FIG. 6 is achieved through companding of the pixel data generated by each pixel element so that a fewer number of bits of pixel data is stored. In the present embodiment, companding is performed to convert the 9 bit pixel data generated for the all-other exposure cases (pixels A and B of FIG. 4) into an 8-bit representation. That is, in the cases where the pixel value for a pixel exceeds the threshold level prior to the last exposure, the lower 9 bits of the pixel data value are compressed into 8 bits and stored as an 8-bit value. In the last exposure case (pixels C and D of FIG. 4), companding is performed to convert the 10 bit pixel data into a 9-bit representation. Thus, in cases where the pixel value of a pixel element has not exceeded the threshold level prior to the last exposure, the 10-bit pixel data captured at the last exposure time is compressed into 9 bits and stored as a 9-bit value.

The 10-bit image information embodiment shown in FIG. 7 realizes a further 1-bit reduction in memory size for each pixel element than the 11-bit embodiment and provides a 3-bit reduction in memory size for each pixel element when compared to the previous method described in FIG. 3. When the 10-bit image information embodiment is applied in image sensor 400, data memory 410 can have a size of N by M by 10 bits only. When DPS array has 1024 pixels by 1024 pixels, data memory 410 only needs to be 10 megabits to implement the 10-bit embodiment for supporting multiple sampling operations.

Companding, derived from compressing and expanding, is a well-known compression technique which uses a non-linear transfer function for the treatment of voice samples. For instance, a function for applying companding provides finer spacing at low volume and wider spacing at the loud end. In accordance with the present invention, companding is applied to image data by exploiting the characteristics of human visual perception. Human visual perception is much more acute at low light conditions than at bright light conditions. Specifically, human eyes can only perceive changes in an image when the changes in the intensity level of the image exceed a certain percentage of the intensity level of the image (the percentage is referred to here as the "perceptible threshold"). Thus, under bright light conditions, the human eyes can only perceive large variations in intensity values, while under low light conditions, the human eyes can perceive smaller variations in intensity values. Accordingly, in the present invention, companding is applied to compress large pixel intensity values representing bright light conditions while preserving the small pixel intensity values representing low light conditions.

When the 10-bit image information embodiment is used in image sensor 400, the image quality at bright light portions of the image may be compromised to a small extent, but there is little or no impact to the image quality at the medium to low light portions of the image. Since the human visual perception is not particularly acute in bright light areas anyway, the viewer may not be able to perceive any degradation in the overall image quality. Furthermore, the benefits obtained from reducing the size of the data memory to achieve lower cost and improved yield outweighs the de minimis image degradation which can be practically perceived.

Figure 8:
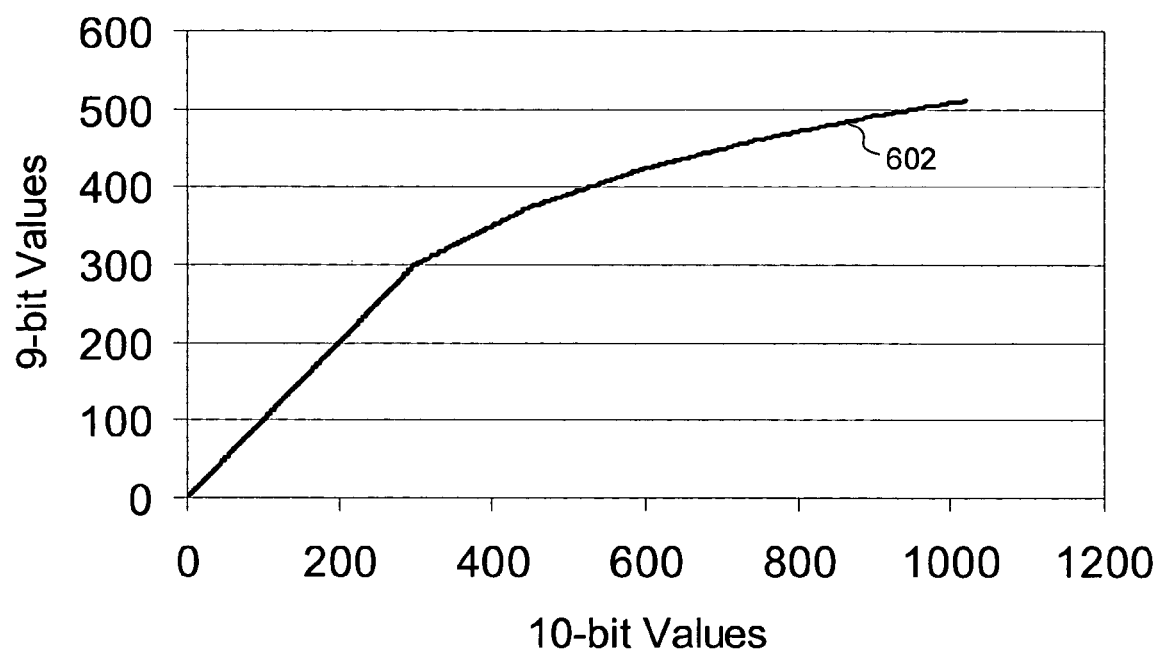
FIG. 8 shows a transfer function for converting a 10-bit value to a 9-bit value.
Figure 9:
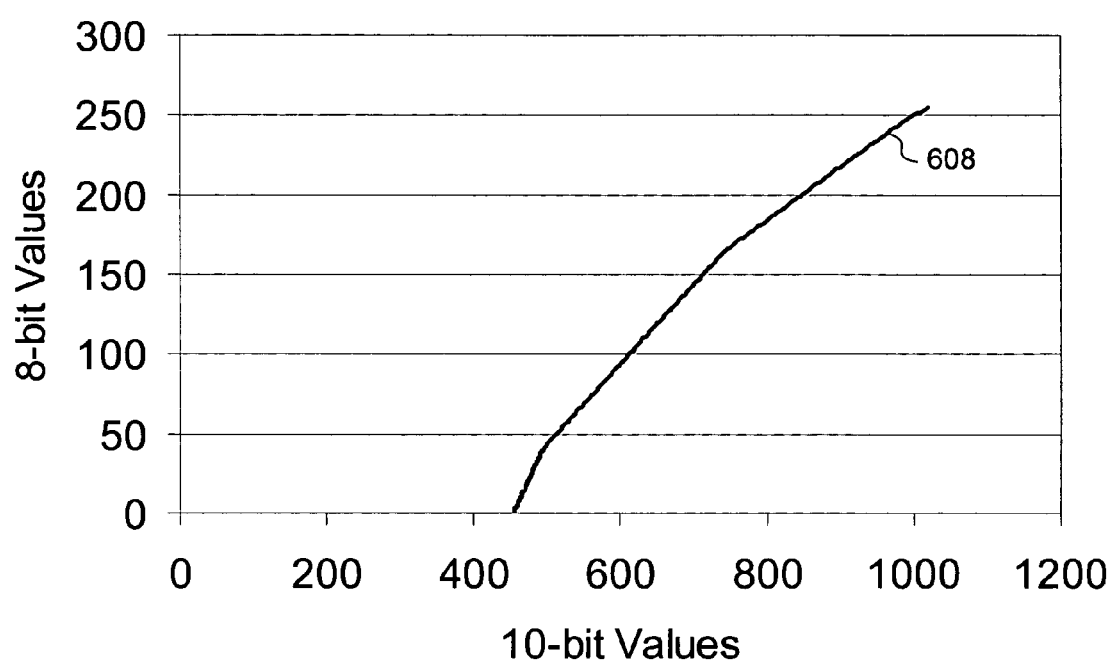
FIG. 9 shows a transfer function for converting a 9-bit value to an 8-bit value.

FIGS. 8 and 9 depict two exemplary transfer functions which can be used in the companding operations of the present invention. FIG. 8 shows a transfer function for converting a 10-bit value to a 9-bit value. The transfer function (depicted by curve 602) is linear at low intensity values (such as below intensity value 300). The slope of curve 602 tapers off at high intensity values so that 10-bit values from 0 to 1023 are mapped to 9-bit values from 0 to 511. In the present embodiment, the increment value of curve 602 is an integer and has an increment value of 1 at low intensity values and an increment value of less than 0.7% at high intensity values. Of course, other transfer functions can also be used in the companding operations of the present invention. In other embodiments, the transfer function can be defined as follows. A percentage increment value for the transfer function is selected which is below the perceptible threshold of human visual capability. The transfer function is derived by stepping through the 10-bit values using the percentage increment value and mapping the 10-bit intensity values to 9-bit intensity values. For low intensity values, the increment value can be rounded up to an integer to preclude the use of unnecessarily fine increment values. For example, when a percentage increment value of 1% is used, at low intensity values, the 10-bit values will increment by 1 while at high intensity values, the 10-bit values will increment by 1%. Thus, for an intensity value of 10, the step size is 1. For an intensity value of 500, the step size is 5. A transfer function such as curve 602 of FIG. 8 can be thus formed.

FIG. 9 illustrates a transfer function (curve 608) which can be used for implementing the 10-bit to 8-bit companding operation according to one embodiment of the present invention. According to the present invention, the 10-bit to 8-bit conversion is performed only for the all-other exposure case where the pixel intensity values have exceeded the threshold level which is 512 in the present example. Thus, in the present embodiment, only pixel intensity values between 512 and 1023 are mapped to the 8-bit values from 0 to 255. Note that pixel intensity values between 512 and 1023 can be represented in 9 bits as the MSB of these values is always a "1." Thus, curve 608 can also be treated as a 9-bit to 8-bit companding transfer function. Referring to FIG. 9, curve 608 maps pixel values from 454 to 1023 to 8-bit values from 0 to 256. In the present embodiment, the 10-bit to 8-bit conversion uses the top 55% of the 10-bit values instead of the top 50% (from 512 to 1023). Of course, in other embodiments, the 10-bit to 8-bit transfer function can be provided for the top 50% of the 10-bit values only. Also, in other embodiments, the transfer function can be provided to map 9-bits values from 0 to 511 to the 8-bit values from 0 to 255. In that case, the MSB of the pixel data is discarded and the lower 9 bits of the pixel data are used in the companding operation.

The transfer functions for the companding operations can be implemented using a look-up table. According to one embodiment of the present where the MCBS analog-to-digital conversion technique is used in the pixel-level ADC circuit, the look-up table is used in the ADC circuit for programming the ramp signal to the comparator. In yet another embodiment of the present invention, the 10-bit image information embodiment can be selectively applied by programming the ramp signal with either an entirely linear function (no companding) or with a transfer function as shown in FIGS. 8–9.

When the 10-bit image information embodiment is used to store image information, the pixel data can be retrieved by applying the companding transfer function in reverse. For example, when the pixel value for pixel A stored in row 524 is to be retrieved, the time index value of "00" in cells 460 and 462 indicates that the pixel value has exceeded the threshold level at exposure time T. The 8-bit pixel value in memory cells 564 is mapped using the transfer function (curve 608) in FIG. 9 in the reverse manner to a 10-bit pixel value. In another embodiment when the transfer function maps the 9-bit pixel values to 8-bit values and the threshold level is at 50%, when the transfer function is applied in reverse, the threshold value 512 is added back onto the 9-bit pixel value to reflect the actual pixel intensity value of pixel A in 10 bits. In the last exposure case when pixel values for pixels C and D are to be retrieved, the value of "1" in the threshold indicator cell 460 signifies that the pixel values have not exceeded the threshold level prior to the last exposure. The 9-bit pixel values in rows 528 and 530 are mapped back to the 10-bit value using the transfer function in FIG. 8 (curve 602). The pixel values can then be normalized and processed as desired. In cases where the compression in the companding operation causes one 9-bit value or one 8-bit value to map to two or more 10-bit values, one of the 10-bit values can be chosen by ensuring that the 10-bit pixel values are spaced apart appropriately.

In the above described embodiments, a two-bit time index value is used to support three exposure times. When the time index value is two bits, the multiple sampling operation according to the present invention can include three exposure times (i.e., T, 2T and 4T) or less. Of course, in other embodiments of the present invention, the time index value can include any number of bits to support any desired number of exposure times. Specifically, the relationship between the number of bits, m, of the time index value and the number of exposure times which can be supported by the method of the present invention is given as follows:

No. of exposure times $\leq 2^m - 1$.

Thus, when the time index value has 3 bits (m=3), the number of exposure times which can be supported is 7 or less. When the time index value has 4 bits (m=4), the number of exposure times which can be supported is 15 or less. As mentioned above, when the time index value is represented in m bits, the threshold indicator information can be encoded using one or more bits of the time index value.

The above detailed descriptions are provided to illustrate specific embodiments of the present invention and are not intended to be limiting. Numerous modifications and variations within the scope of the present invention are possible. For example, while in the above described embodiments, companding is performed to reduce the number of bits of the pixel data by 1 bit, it is, of course, possible to use companding to reduce the number of bits in the pixel data by more than 1 bit. Of course, companding more than 1 bit may result in a loss of image information, particularly at bright light conditions. The amount of companding which can be used is a function of the application the image data is being applied to. For certain applications, the loss of image information may not be important and may not impact image quality. Thus, companding of more than 1 bit can be used to further reduce the size of the data memory needed in the image sensor. Furthermore, while in the above description, the multiple sampling operations used a 50% threshold level, one of ordinary skill in the art would appreciate that other values of threshold level can be used, such as 22% or 65%. The present invention is defined by the appended claims.

We claim:

1. An image sensor, comprising:

a sensor array comprising a two-dimensional array of pixel elements, said sensor array outputting digital signals as k-bit pixel data representing an image of a scene, and said sensor array generating multiple representations of said image at a plurality of exposure times; and a data memory, in communication with said sensor array, for storing an m-bit time index value and said pixel data for each of said pixel elements, said time index value indicating one of said plurality of exposure times in which said pixel data exceeds a predetermined threshold level and for which said pixel data is stored, said time index value including a t-bit threshold indication for each of said pixel elements encoded within said m-bit time index value;

wherein said data memory includes k+t bits of memory space for each of said pixel element; said data memory stores said time index value in t bits and said k-bit pixel data for pixel data being captured in a last one of said plurality of exposure times; and said data memory stores said time index value in m-bit and stores the lower r bits, where r=k+t−m, of said pixel data for pixel data exceeding said predetermined threshold level in other exposure times.

2. The image sensor of claim 1, wherein said sensor array is fabricated in an integrated circuit.

3. The image sensor of claim 1, wherein said sensor array is of N by M pixels and said data memory is N by M by k+1 bits where said time index value is in 2-bit and said threshold indicator is a first bit of said time index value.

4. The image sensor of claim 3, wherein r=k−1.

5. The image sensor of claim 1, wherein a first bit of said time index value represents said threshold indication.

6. The image sensor of claim 1, wherein said sensor array further comprises a companding circuit for companding said k-bit pixel data into h bits, h being less than k; and said data memory stores said pixel data in h bits for pixel data being captured in said last one of said plurality of exposure times and stores said pixel data in h+t−m bits for pixel data exceeding said predetermined threshold level in all other exposure times.

7. The image sensor of claim 6, wherein said companding circuit comprises a look-up table containing values for mapping a k-bit number to a h-bit number.

8. The image sensor of claim 7, wherein h=k−1.

9. The image sensor of claim 7, wherein said sensor array further comprises a plurality of analog-to-digital conversion (ADC) circuits, each of said plurality of ADC circuit being coupled to one or more pixel elements, and said companding circuit is coupled to said plurality of ADC circuits to cause said ADC circuits to generate said pixel data in h bits.

10. The image sensor of claim 9, wherein said plurality of ADC circuits employs Multi-Channel Bit Serial analog-to-digital conversion technique and said companding circuit is coupled to said plurality of ADC circuits for programming a ramp signal of each of said ADC circuits.

11. The image sensor of claim 1, wherein said plurality of exposure times comprise any of a relatively short exposure time for capturing image information that is related to high illumination areas in said image, a relatively long exposure time for capturing image information that is related to low illumination areas in said image, and intermediate exposure times for capturing image information that is related to gradually increasing illumination areas in said image; and wherein a combination of said multiple representations of said image at a plurality of exposure time establishes a wide dynamic range for said sensor array.

12. The image sensor of claim 1, wherein, after pixel data for a first representation of said image is read out and stored in said data memory, pixel data for a second representation of said image is selectively read out into said data memory to improve, update or enhance pixel data stored therein for each of said pixel elements.

13. The image sensor of claim 12, wherein said selective read out of said second representation of said image is controlled by said threshold indication of said time index value for each of said pixel elements.

14. A method for generating electrical signals representing an image in a digital image sensor, comprising:

generating digital signals as k-bit pixel data at a plurality of exposure times, said pixel data being associated with each pixel element in a sensor array of pixel elements and corresponding to a level of an analog signal indicative of a light intensity impinging on said pixel element;

providing a data memory for storing an m-bit time index value and said pixel data for each of said pixel elements, said time index value indicating one of said plurality of exposure times in which said pixel data exceeds a predetermined threshold level and for which said pixel data is stored, said time index value including a t-bit threshold indication for each of said pixel elements encoded within said m-bit time index value;

determining if said pixel data of a first one of said pixel elements exceeds said predetermined threshold value;

if said pixel data exceeds said predetermined threshold value at exposure times before a last one of said plurality of exposure times, storing said time index value in m bits in a location in said data memory associated with said first one of said pixel elements having a first value indicating said exposure time; and storing the lower r bits of said pixel data in a location in said data memory, where r=k+t−m and r=k−1; and if said pixel data does not exceed said predetermined threshold value, storing said time index value in t bits in said location in said data memory associated with said first one of said pixel elements having a second value, and storing k bits of pixel data in said data memory.

15. The meted of claim 14, further comprising:

if said pixel data does not exceed said predetermined threshold value before said last one of said plurality of exposure times, storing said k bits pixel data in said data memory for pixel data recorded in said last one of said plurality of exposure times.

16. The method of claim 14, wherein said generating at a plurality of exposure times digital signals in k-bit as pixel data comprises companding said k-bit pixel data into h bits, h being less than k, and said storing the lower r bits of said pixel data in said data memory comprises storing the lower h−1 bits of said pixel data.

17. The method of claim 16, further comprising:

if said pixel data does not exceed said predetermined threshold value before said last one of said plurality of exposure times, storing said h bits pixel data in said data memory for pixel data recorded in said last one of said plurality of exposure times.

18. The method of claim 16, wherein h=k−1.

* * * * *